United States Patent [19]

Tanaka et al.

[11] Patent Number: 4,761,365
[45] Date of Patent: Aug. 2, 1988

[54] PHOTOGRAPHIC LIGHT-SENSITIVE MATERIALS CONTAINING SPECIFIC MAGENTA DYES TO CONTROL PHOTOGRAPHIC SENSITIVITY

[75] Inventors: Mitsugu Tanaka; Minoru Sakai, both of Kanagawa, Japan

[73] Assignee: Fuji Photo Film Co., Ltd., Kanagawa, Japan

[21] Appl. No.: 747,491

[22] Filed: Jun. 21, 1985

[30] Foreign Application Priority Data

Jun. 22, 1984 [JP] Japan .................. 59-128834

[51] Int. Cl.$^4$ .................. G03C 1/08; G03C 7/26; G03C 7/32
[52] U.S. Cl. .................. 430/555; 430/554
[58] Field of Search .................. 430/554, 555

[56] References Cited

U.S. PATENT DOCUMENTS

| | | | |
|---|---|---|---|
| 3,615,611 | 10/1971 | Bannert et al. | 430/554 |
| 4,135,933 | 1/1979 | Hinata et al. | 430/554 X |
| 4,309,500 | 1/1982 | Shishido | 430/554 X |
| 4,362,813 | 12/1982 | Mihara et al. | 430/555 X |

FOREIGN PATENT DOCUMENTS 18459 10/1966 Japan .
871936 7/1961 United Kingdom ............... 430/555

*Primary Examiner*—Mukund H. Shah

*Attorney, Agent, or Firm*—Sughrue, Mion, Zinn, Macpeak, and Seas

[57] ABSTRACT

A silver halide photographic light-sensitive material is disclosed, comprising a support base having coated thereon a photographic layer containing a magenta dye represented by formula (I)

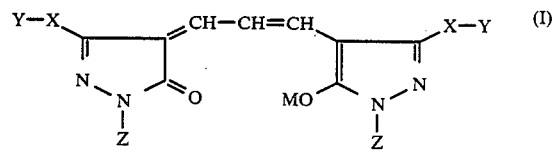

wherein X represents

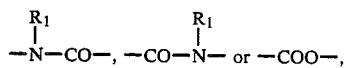

wherein $R_1$ represents a hydrogen atom or an alkyl group; Y and Z each represents a substituted or nonsubstituted alkyl group, a substituted or nonsubstituted aryl group, a substituted or nonsubstituted aralkyl group, wherein the substituent of the substituted alkyl group, aryl group or aralkyl group is not a sulfo group or a carboxyl group and the total of carbon atoms in Y and Z is 15 or more; and M represents a hydrogen atom or a cation.

7 Claims, No Drawings

PHOTOGRAPHIC LIGHT-SENSITIVE MATERIALS CONTAINING SPECIFIC MAGENTA DYES TO CONTROL PHOTOGRAPHIC SENSITIVITY

FIELD OF THE INVENTION

The present invention relates to photographic light-sensitive materials. Particularly, it relates to silver halide photographic light-sensitive sheets for a color diffusion transfer process which contain a magenta dye for controlling photographic sensitivity.

BACKGROUND OF THE INVENTION

Hitherto, the art of controlling photographic sensitivity by incorporating dyes has been known by, for example, Japanese Patent Application (OPI) No. 33825/73 (the term "OPI" as used herein refers to a "published unexamined Japanese patent application") and U.S. Pat. No. 3,990,898. However, magenta dyes described therein have problems in that they have an adverse influence upon the photographic sensitivity of layers other than the desired green-sensitive layer because they have a broad absorption, they diffuse into other layers to cause fog or stain, etc., because of having insufficient diffusion resistance, or they cause deterioration of film strength or they are precipitated by the passage of time, because a large amount of oil must be used because of having insufficient solubility in oil.

Magenta dyes which are not used for the purpose of controlling photographic sensitivity but used as a color filter or for the purpose of preventing halation have been described in Japanese Patent Publication No. 18459/66. However, the above described problem cannot be solved by these dyes, if they are used for the purpose of controlling photographic sensitivity.

SUMMARY OF THE INVENTION

An object of the present invention is to provide photographic light-sensitive materials containing a novel magenta dye for controlling photographic sensitivity which has the following characteristics (1) to (3).

(1) The absorption wavelengths are in a desirable region and the wave form is sharp. Accordingly, the degree of influence upon the photographic sensitivity of layers other than the desired green-sensitive layer is very small.

(2) It has sufficient diffusion resistance. Accordingly, it does not cause adverse influences on photographic performances, such as fog or stain, etc., caused by diffusion into other layers.

(3) The solubility in solvents such as oil, etc., is high. Accordingly, it can be dispersed with a small amount of solvent which is advantageous in terms of film thickness or film strength. Further, it is not precipitated by the passage of time.

The above described objects can be attained by providing photographic light-sensitive materials comprising a photographic layer containing a magenta dye represented by the following formula (I) provided on a support base.

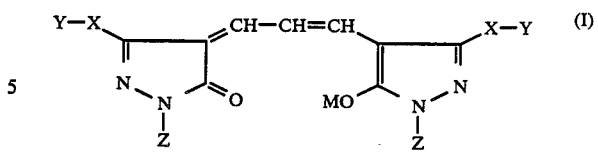

wherein X represents

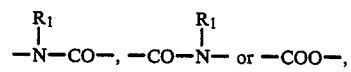

wherein $R_1$ represents a hydrogen atom or an alkyl group; Y and Z each represent a substituted (exclusive of a sulfo group and a carboxyl group) or nonsubstituted alkyl group, aryl group or aralkyl group, but the total of carbon atoms in Y and Z is 15 or more; and M represents a hydrogen atom or a cation.

DETAILED DESCRIPTION OF THE INVENTION

The magenta dyes of the present invention are illustrated in greater detail in the following.

The alkyl group represented by $R_1$ may be a straight chain group or a branched chain group or may be substituted. As substituents, there are an alkoxy group, a halogen atom and a hydroxyl group.

Preferred examples of the alkyl group represented by $R_1$ include a straight chain group having 1 to 6 carbon atoms.

The alkyl group and the substituted alkyl group represented by Y or Z may be a straight chain or a branched chain or may be a cyclic group.

Preferred examples of the alkyl group represented by Y and Z include an alkyl group having 1 to 18 carbon atoms.

As the substituted or nonsubstituted aryl groups, substituted or nonsubstituted phenyl groups are preferred.

As the substituted or nonsubstituted aralkyl groups, alkyl groups (the carbon atoms of the alkyl group to be substituted by an aryl group are preferably 1 or 2) substituted by a substituted or nonsubstituted phenyl group are preferred.

Preferred examples of substituents in the above described substituted alkyl groups, substituted aryl groups, or substituted aralkyl groups include a halogen atom (particularly, a chlorine atom), an alkyl group having 1 to 18 carbon atoms, an alkoxy group having 1 to 18 carbon atoms, an acylamino group, a carbamoyl group and an ester group.

The above described acylamino group may be an aliphatic or aromatic group. In particular, groups represented by $R_2CONH-$ (wherein $R_2$ is an alkyl group (which may be branched) or a substituted alkyl group) are desired where substituents are an aryloxy group, an alkoxy group and an aryl group, etc. $R_2$ may be a phenyl group or a substituted phenyl group, and, as the substituents, there are an alkyl group and an alkoxy group, etc. These substituents may be further substituted.

The above described carbamoyl groups include those substituted by an alkyl group or an aryl group. These alkyl groups or aryl groups may be substituted by substituents as described for the acylamino group.

The above described ester group may be an aliphatic or aromatic group. In particular, groups represented by R₃OCO— (wherein R₃ is the same meaning as R₂) are preferred. In any case, Y and Z should be selected so that the total carbon atom thereof is 15 or more (i.e., two pairs of Y and Z in both sides contain 30 or more carbon atoms).

In the above substituted alkyl groups, aryl groups, or aralkyl groups which are represented by Y and Z, the substituent is not a sulfo group and a carboxyl group. This is because these substituents tend to impart the undesired properties such as water solubility and diffusion property to the magenta dye of the present invention.

Preferred examples of the cation represented by M include Na⁺ and K⁺.

More desirable examples of dyes represented by the formula (I) include those wherein indication of the formula is as follows.

X represents —NHCO—, —CONH— or —COO—.

Y represents an alkyl group having 10 to 18 carbon atoms, an alkyl group substituted by an alkoxy group having 1 to 18 carbon atoms, or a phenyl group substituted by the following substituents, namely, an alkyl group having 5 to 18 carbon atoms, an alkoxy group having 5 to 18 carbon atoms, an acylamino group having 5 to 25 carbon atoms, a carbamoyl group having 5 to 25 carbon atoms or an ester group having 5 to 25 carbon atoms.

Z represents a nonsubstituted phenyl group or a phenyl group substituted by chlorine atoms.

M represents Na⁺ or K⁺.

The total of carbon atoms in Y and Z is 15 or more, and the least upper bound thereof depends upon the limit of dissolution of the dye in the solvent.

Examples of dyes used in the present invention are shown in the following.

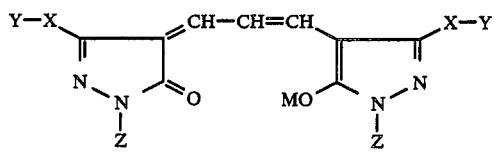

| Compound No. | X | Y | Z | M |
|---|---|---|---|---|
| 1 | —NH—C(=O)— | —C₆H₄—NHCOCH(C₂H₅)—O—C₆H₃(C₅H₁₁(t))(C₅H₁₁(t)) (via 3-position)— with terminal C₅H₁₁(t) | 2,4,6-trichlorophenyl | Na |
| 2 | —NH—C(=O)— | —C₆H₄—NHCOCH₂—O—C₆H₃(C₅H₁₁(t))(C₅H₁₁(t))— | 2,4,6-trichlorophenyl | K |
| 3 | —COO— | —C₁₂H₂₅ | phenyl | K |
| 4 | —CONH— | —C₁₆H₃₃ | phenyl | Na |

-continued

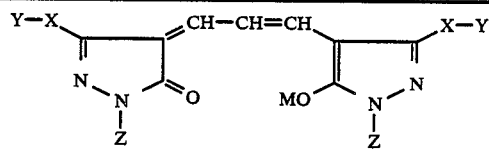

| Compound No. | X | Y | Z | M |
|---|---|---|---|---|
| 5 | —COO— | —CH₃ | (p-tolyl-NH-C(=O)-CH(C₄H₉)-O-[2,4-di-C₅H₁₁(t)-phenyl]) | K |
| 6 | —CONH— | —C₂H₄—OC₁₂H₂₅ | —CH₃ | Na |
| 7 | —NH—C(=O)— | (m-COOC₁₄H₂₉-phenyl) | (2,4,6-trichlorophenyl) | Na |

Compounds of the present invention can be synthesized by the following route.

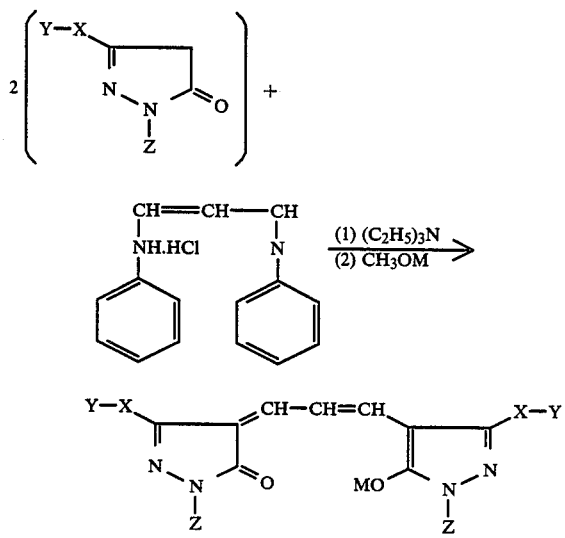

In the above reaction equation, X, Y, Z and M have the same meaning as in the above described formula (I).

SYNTHESIS EXAMPLE 1

Synthesis of Compound 1

500 g of 1-(2,4,6-trichlorophenyl)-3-{3-[α-(2,4-di-t-amylphenoxy)butyramido]benzamido}-5-pyrazolone, 92.3 g of malonaldehydedianil hydrochloride, 200 ml of triethylamine and 1.7 l of dimethylacetamide were stirred at room temperature for 8 hours. To the reaction mixture, 1.5 l of ethyl acetate and 1.3 l of a 10% by weight solution of salt (brine) were added and stirring was continued for 5 minutes. The ethyl acetate layer was separated and washed with 2 l of a 10% by weight solution of salt (brine), followed by drying with anhydrous sodium sulfate. After ethyl acetate was distilled away under reduced pressure, 3 l of hot methanol to which 70 g of sodium acetate was dissolved was added to dissolve with heating. It was stirred for 10 hours under room temperature and separated crystal was filtered off and dried to obtain 381 g (yield 73.2%) of the desired product. m.p.: 213° to 216° C.

SYNTHESIS EXAMPLE 2

Synthesis of Compound 2

The desired product was obtained from 1-(2,4,6-trichlorophenyl)-3-{3-[α-(2,4-di-t-amylphenoxy)acetamido]benzamido}-5-pyrazolone by the same manner as in Synthesis Example 1. m.p.: 208° to 217° C.

SYNTHESIS EXAMPLE 3

Synthesis of Compound 3

The desired product was obtained from 1-phenyl-3-dodecyloxycarbonyl-5-pyrazolone by the same manner as in Synthesis Example 1. m.p.: 200° C.

The dye represented by the above described formula (I) may be added to any layer, if the layer is on an upper position on the green-sensitive emulsion layer with respect to the exposure direction. It is particularly preferred to add it to an intermediate layer between, for example, the green-sensitive emulsion layer and the blue-sensitive emulsion layer, or a protective layer or a layer containing an ultraviolet ray absorbing agent. In order to keep the sensitivity balance of red (R), green (G) and blue (B), a coating solution containing the above described dye may be applied to the protective layer.

In the intermediate layer, hydroquinone derivatives such as dialkylhydroquinones having a tertiary alkyl group having 15 carbon atoms on 2 and 5 positions, dialkylhydroquinones having a secondary alkyl group having 12 carbon atoms on 2 and 5 positions or arylsulfonylhydroquinone compounds, etc., can be used as scavengers which have a function of annulling oxidants of undesired developing agents. The dyes according to the present invention have an effect that they do not fade, if these scavengers exist together.

The preferred amount of the hydroquinone derivatives used is about 0.1 to 1.5 g/m².

The dyes according to the present invention can be dispersed in hydrophilic colloids by various processes.

(1) A process which comprises dispersing the compound by adding a solution obtained by dissolving the compound in an oil, namely, a high boiling point solvent which is substantially insoluble in water and has a boiling point of about 160° C. or more, to a hydrophilic colloid solution. As the high boiling point solvents, it is possible to use, for example, phthalic acid alkyl esters (dibutyl phthlate, dioctyl phthalate, etc.), phosphoric acid esters (diphenyl phosphate, triphenyl phosphate, tricresyl phosphate and dioctylbutyl phosphate), citric acid esters (for example, tributyl acetylcitrate), benzoic acid esters (for example, octyl benzoate), alkylamides (for example, diethyl laurylamide), aliphatic acid esters (for example, dibutoxyethyl succinate and diethyl azelate), trimesic acid esters (for example, tributyl trimesate), etc., as described in U.S. Pat. No. 2,322,027. Further, it is possible to use organic solvents having a boiling point of about 30° C. to about 150° C., for example, lower alkyl acetates such as ethyl acetate or butyl acetate, ethyl propionate, secondary butyl alcohol, methyl isobutyl ketone, β-ethoxyethyl acetate, methyl cellosolve, and solvents easily soluble in water, for example, alcohols such as methanol or ethanol, etc.

Other examples of high boiling point solvents capable of being used have been described in U.S. Pat. Nos. 2,533,514 and 2,801,171.

(2) A process which comprises dissolving the compound with a surface active agent.

Useful surface active agents are oligomers or polymers and, preferably, polymers containing at least 5% by mol of a repeating unit represented by the following formula (II)

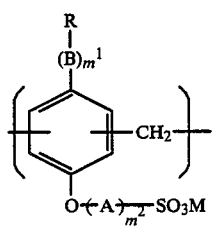

(II)

wherein R represents a substituted or nonsubstituted aliphatic hydrocarbon group, $m^1$ and $m^2$ represent each 0 or 1, B represents —O— or —NH—, A represents a divalent aliphatic hydrocarbon group (which may contain an oxygen atom), and M represents a cation capable of forming a salt with sulfonic acid.

Details of these polymers have been described in U.S. patent application Ser. No. 695,761, pages 14 to 21 (filed on Jan. 28, 1985, by Fuji Photo Film Co., Ltd.).

(3) A process which comprises using a hydrophilic polymer instead of or together with the high boiling point solvent described in (1). This process has been described in, for example, U.S. Pat. No. 3,619,195 and West German Pat. No. 1,957,467.

(4) A process which comprises dissolving the compound in a water miscible solvent and adding an aqueous latex to the resulting solution to obtain a dispersion wherein the compound is contained in latex grains. This process has been described in, for example, Japanese Patent Application (OPI) No. 59943/76 (corresponding to U.S. Pat. No. 4,214,047).

The magenta dye according to the present invention is preferably used in an amount of about $1 \times 10^{-6}$ to $1.5 \times 10^{-4}$ mol/m² in terms of controlling photographic sensitivity.

In addition, hydrosol of an oleophilic polymer described in, for example, Japanese Patent Publication No. 39835/76 may be added to the hydrophilic colloid dispersion obtained as described above.

As the hydrophilic colloid, gelatin is a typical one, but any material known for photographic use can be used.

Silver halide photographic emulsions capable of being used for the light-sensitive materials of the present invention may be the so-called negative emulsions or may be direct positive emulsions which do not require reversal processing.

As image forming substances capable of being used in combination with the photographic emulsions, there are color couplers, diffusible dye releasing redox compounds (DRR compounds) or couplers (DDR couplers), and dye developing agents, etc. The image forming substance may be either negative working type or positive working type.

As support base used in the present invention, any support base known for photographic use can be used. The typical example thereof include a plastic support base such as polyethylene terephthalate and the like, a polyethylene-laminated paper base support, etc.

The light-sensitive materials of the present invention are suitable for color photography and, particularly, color diffusion transfer process or heat developing color photography.

In the case that the light-sensitive materials of the present invention are used for the color diffusion transfer process, the photographic emulsions may be applied to the same support base as the support base to which an image receiving layer is applied or may be applied to a different support base. The silver halide photographic emulsion layers (light-sensitive element) and the image receiving layer (image receiving element) may be provided in a combined state as a film unit or may be provided as separate independent photographic materials. The film unit may be in a state of being united in a body throughout exposure, development and appreciation of transfer image or may be a type of being divided after development.

The light-sensitive materials are particularly preferred to be those wherein a light-sensitive element and an image receiving element are applied to different support bases and they are separated after development.

The following examples are provided for illustrated purposes only and are in no way intended to limit the scope of the present invention.

EXAMPLE 1

To a black base, the following layers (1) to (11) were applied in turn to prepare a light-sensitive sheet.

(1) A layer containing the following DRR compound (0.36 mmol/m²), tricyclohexyl phosphate (0.09 g/m²) and 2,5-di(t-pentadecyl)hydroquinone (0.01 g/m²).

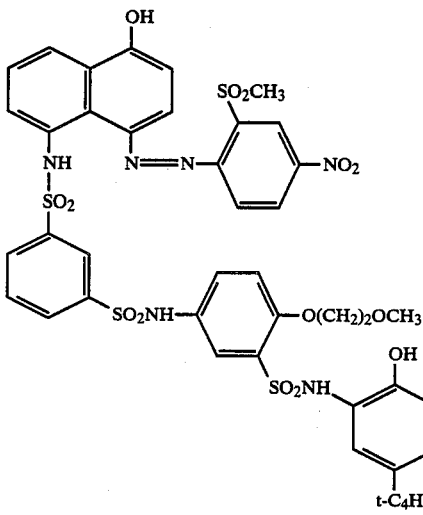

(2) A layer containing a red-sensitive internal latent image type direct positive silver bromide emulsion 0.5 g/m² as silver), gelatin (0.78 g/m²), the following nucleating agent (27 μg/m²) and sodium pentadecylhydroquinonesulfonate (0.06 g/m²).

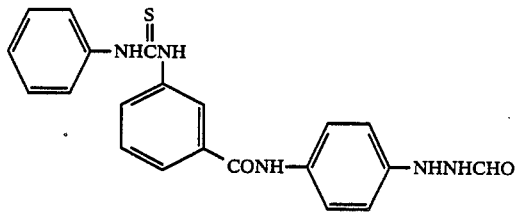

(3) A layer containing 2,5-di(tert-pentadecyl)hydroquinone (0.71 g/m²), vinylpyrrolidone-vinyl acetate copolymer (molar ratio 7:3) (0.24 g/m²) and gelatin (0.4 g/m²).

(4) A layer containing gelatin (0.3 g/m²).

(5) A layer containing the following magenta DRR compound (0.49 g/m²), tricyclohexyl phosphate (0.8 g/m²), 2,5-di(tert-pentadecyl)hydroquinone (0.01 g/m²) and gelatin (0.5 g/m²).

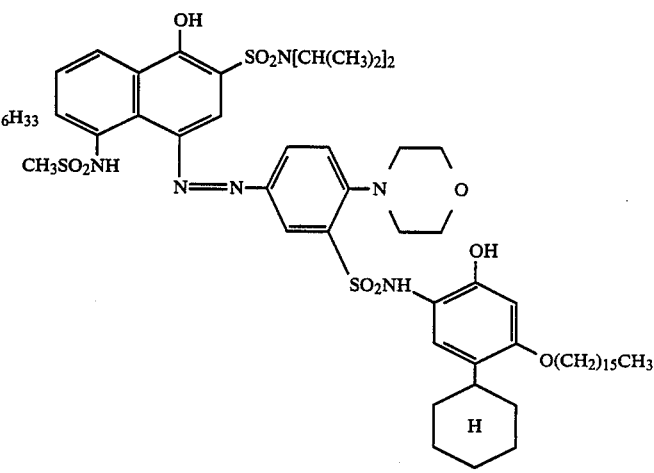

(6) A layer containing a green-sensitive internal latent image type direct positive silver bromide emulsion (0.34 g/m² as silver), gelatin (0.66 g/m²), the same nucleating agent as in the layer (2) (12.9 μg/m²) and sodium pentadecylhydroquinonesulfonate (0.4 g/m²).

(7) A layer containing 2,5-di(tert-pentadecyl)hydroquinone (0.71 g/m²), vinylpyrrolidone-vinyl acetate copolymer (molar ratio 7:3) (0.24 g/m²) and gelatin (0.4 g/m²).

(8) A layer containing gelatin (0.25 g/m²).

(9) A layer containing the following yellow DRR compound (0.48 g/m²), tricyclohexyl phosphate (0.03 g/m²), 2,5-di(tert-pentadecyl)hydroquinone (0.004 g/m²) and gelatin (0.43 g/m²).

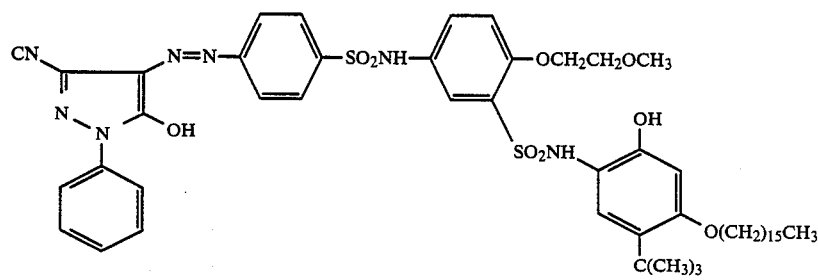

(10) A layer containing a blue-sensitive internal latent image type direct positive silver bromide emulsion (0.84 g/m² as silver), gelatin (0.9 g/m²), the same nucleating agent as in the layer (2) (29 mg/m²) and sodium pentadecylhydroquinonesulfonate (0.05 g/m²).

(11) A layer containing gelatin (1.0 g/m²).

0.8 g of a processing solution having the following composition was put in a destructible container.

Processing Solution

| Benzyl Alcohol | 0.20 ml |
|---|---|
| 1-(p-Tolyl)-4-hydroxymethyl-4-methyl-3-pyrazolidinone | 0.3 g |
| Methyl Hydroquinone | 0.012 g |
| 5-Methylbenzotriazole | 0.6 g |
| Sodium Sulfite | 0.18 g |
| Hydroxymethyl Cellulose | 4 g |
| Potassium Hydroxide (28% aq. soln.) | 22.4 ml |
| H₂O | 67 ml |

To a white base wherein a carbon black layer and a titanium white layer were applied to the back face thereof in turn, the following layers (12) to (16) were applied in turn to prepare an image receiving sheet.

(12) A layer containing a copolymer of 80:20 (ratio by weight) of acrylic acid and butyl acrylate (22 g/m²) and 1,4-bis(2,3-epoxypropoxy)butane (0.44 g/m²).

(13) A layer containing acetyl cellulose (100 g of acetyl cellulose was hydrolyzed to form 39.4 g of acetyl group) (3.8 g/m²), a copolymer of 60:40 (ratio by weight) of styrene and maleic acid anhydride (molecular weight: about 50,000) (0.2 g/m²) and 5-(β-cyanoethylthio)-1-phenyltetrazole (0.115 g/m²).

(14) A layer containing a copolymer latex of 85:12:3 (ratio by weight) of vinyldene chloride, methyl acrylate and acrylic acid (2.5 g/m²) and a polymethyl methacrylate latex (particle size: 1 to 3 microns) (0.05 g/m²).

(15) A mordanting layer containing the following mordanting agent (3.0 g/m²) and gelatin (3.0 g/m²).

(16) A layer containing phthalated gelatin (1 g/m²).

In the above described Light-Sensitive Sheet Sample A, solutions prepared by dissolving the above described Compounds 1, 4, 5 and 6 of the present invention and Comparative Compounds 1 and 2 (described later) in an amount necessary to control 0.1 of sensitivity of the green-sensitive layer (ca 10 to 20 mg/m²) in N,N-diethyllaurylamide were incorporated, respectively, to the layer (11) to produce Samples B to G.

After Samples A to G were exposed to light at 4,800° K., 1/100 second and 10 CMS through an exposure wedge in which gray density changed every 0.4/cm, each of them was placed on the above described image receiving sheet, and the above described processing solution was spread out between them by a pressure member so as to result in a thickness of 60 μm to obtain a transfer color image. The results obtained by sensitometry are shown in Table 1.

TABLE 1

| Sample | Additive in Layer (11) | Lowering of Sensitivity of B* | Lowering of Sensitivity of R* | D^G Min** |
|---|---|---|---|---|
| Sample A | — (Comparison) | 0 | 0 | 0.10 |
| Sample B | Compound 1 of this invention | 0.011 | 0.009 | 0.10 |
| Sample C | Compound 4 of this invention | 0.015 | 0.007 | 0.10 |
| Sample D | Compound 5 of this invention | 0.010 | 0.011 | 0.11 |
| Sample E | Compound 6 of this invention | 0.018 | 0.007 | 0.10 |
| Sample F | Comparative Compound 1 | 0.040 | 0.019 | 0.11 |
| Sample G | Comparative Compound 2 | — | — | 0.83 |

*Lowering of sensitivity of B or R in the case that the sensitivity of G is varied 0.1 (value in the case that the sensitivity of Sample A is zero).
**Value of minimum density at 30 minutes after spreading.

Comparative Compound 1

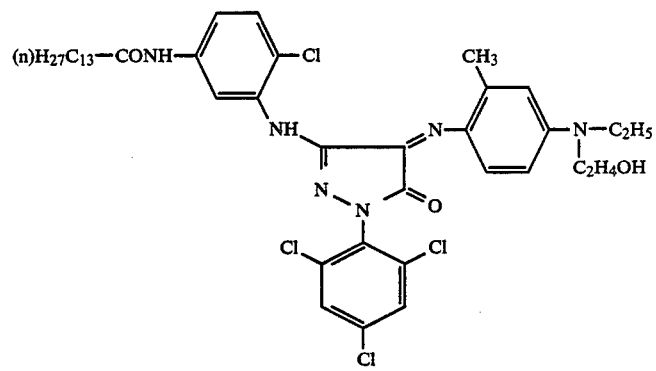

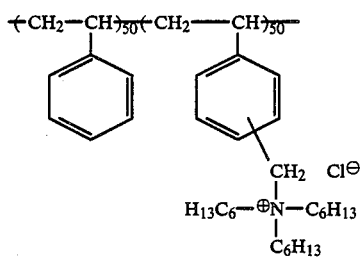

(magenta dye prepared by coupling a conventional magenta coupler with a phenylenediamine color developing agent)

Comparative Compound 2

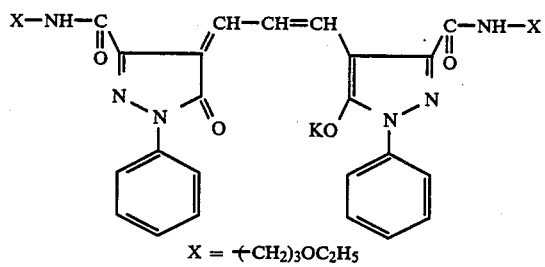

X = —(CH₂)₃OC₂H₅

(compound described in Japanese Patent Publication No. 18459/66).

It is obvious that the magneta dyes of the present invention do not cause color fog as shown by the results in Table 1 wherein the lowering of sensitivity of the layers other than the green-sensitive layer is very low and the $D^G$ min is small.

EXAMPLE 2

To a polyethylene terephthalate support base, the following layers (1) and (2) were applied in turn to produce a filter.

(1) A layer containing gelatin (2 g/m²).
(2) A layer containing gelatin (1 g/m²).

In the above described filter named Sample (1), solutions prepared by dissolving Compounds 1, 4 and 5 of the present invention and Comparative Compounds 1 and 2 (the same as in Example 1) in such an amount that the maximum absorption density in the visible absorption 500 to 600 nm was about 0.5, in N,N-diethyllaurylamide were incorporated, respectively, in the layer (1) to produce Samples (2), (3), (4), (5) and (6).

The spectral absorption in Samples (2) to (6), where the absorption density of Sample (1) was zero, was measured. The results obtained are shown in Table 2.

TABLE 2

| Sample No. | Additive in Layer (2) | λ Dmax (nm) | Half Value Width | Dx = 500 nm* | Dx = 600 nm* |
|---|---|---|---|---|---|
| Sample (2) | Compound 1 of this invention | 548 | 71 | 0.32 | 0.07 |
| Sample (3) | Compound 4 of this invention | 543 | 68 | 0.44 | 0.04 |
| Sample (4) | Compound 5 of this invention | 558 | 65 | 0.27 | 0.10 |
| Sample (5) | Comparative Compound 1 | 532 | 88 | 0.73 | 0.22 |
| Sample (6) | Comparative Compound 2 | 558 | 72 | 0.32 | 0.09 |

*Absorption density in each wavelength in the case that the density in the maximum absorption wavelength is 1.00.

It is obvious from the results shown in Table 2 that in case of using the magenta dyes of the present invention the half value width is small, absorptions in 500 nm and 600 nm are very small and the absorptions are sharp.

While invention has been described in detail and with reference to specific embodiments thereof, it will be apparent to one skilled in the art that various changes and modifications can be made therein without departing from the spirit and scope thereof.

What is claimed is:

1. A silver halide photographic light-sensitive material comprising a support base having coated thereon a photographic layer containing a magenta dye represented by formula (I):

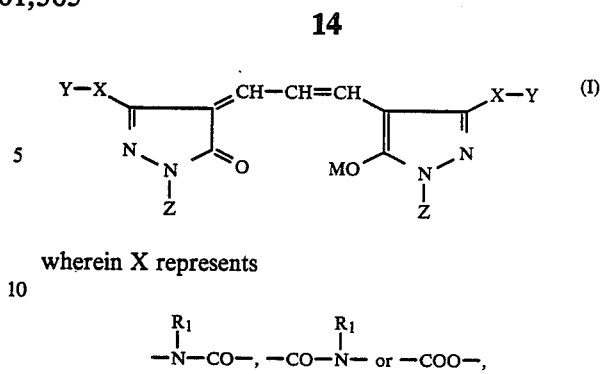

wherein X represents $$-\underset{\underset{R_1}{|}}{N}-CO-,\ -CO-\underset{\underset{R_1}{|}}{N}-\ \text{or}\ -COO-,$$

wherein $R_1$ represents a hydrogen atom or an alkyl group; Y and Z each represent a substituted or nonsubstituted alkyl group, a substituted or nonsubstituted aryl group, a substituted or nonsubstituted aralkyl group, wherein the substituent of the substituted alkyl group, aryl group or aralkyl group is not a sulfo group or a carboxyl group and the total of carbon atoms in Y and Z is 15 or more; and M represents a hydrogen atom or a cation, wherein the alkyl group represented by Y and Z has from 1 to 18 carbon atoms, and wherein said substituents are selected from the group consisting of a halogen atom, an alkyl group having 1 to 18 carbon atoms, an alkoxy group having 1 to 18 carbon atoms, an acylamino group, a carbamoyl group and an ester group.

2. The silver halide photographic light-sensitive material as claimed in claim 1, wherein $R_1$ represents a straight chain alkyl group having from 1 to 6 carbon atoms.

3. The silver halide photographic light-sensitive material as claimed in claim 1, wherein said acylamino group is represented by $R_2CONH-$, wherein $R_2$ is a branched or unbranched alkyl group or an alkyl group substituted by an aryloxy group, an alkoxy group or an aryl group; or a phenyl group or a phenyl group substituted by an alkyl group or an alkoxy group.

4. The silver halide photographic light-sensitive material as claimed in claim 1, wherein said carbamoyl group is a nonsubstituted carbamoyl group or a carbamoyl group substituted by an alkyl group or an aryl group.

5. The silver halide photographic light-sensitive material as claimed in claim 1, wherein said ester group is represented by $R_3OCO-$, wherein $R_3$ is a branched or unbranched alkyl group or an alkyl group substituted by an aryloxy group, an alkoxy group or an aryl group; or a phenyl group or a phenyl group substituted by an alkyl group or an alkoxy group.

6. The silver halide photographic light-sensitive material as claimed in claim 1, wherein M represents $Na^+$ or $K^+$.

7. The silver halide photographic light-sensitive material as claimed in claim 1, wherein X represents $-NHCO-$, $-CONH-$ or $-COO-$; Y represents an alkyl group having 10 to 18 carbon atoms, an alkyl group substituted by an alkoxy group having 1 to 18 carbon atoms, or a phenyl group substituted by an alkyl group having 5 to 18 carbon atoms, an alkoxy group having 5 to 18 carbon atoms, an acylamino group having 5 to 25 carbon atoms, a carbamoyl group having 5 to 25 carbon atoms or an ester group having 5 to 25 carbon atoms; Z represents a non-substituted phenyl group or a phenyl group substituted by a chlorine atom; and M represents $Na^+$ or $K^+$.

* * * * *